United States Patent [19]
Pine

[11] 3,904,550
[45] Sept. 9, 1975

[54] HYDROCARBON CONVERSION CATALYST COMPRISING ALUMINA AND ALUMINUM PHOSPHATE

[75] Inventor: Lloyd A. Pine, Greenwell Springs, La.

[73] Assignee: Exxon Research and Engineering Company, Linden, N.J.

[22] Filed: Oct. 19, 1973

[21] Appl. No.: 408,041

[52] U.S. Cl. ............... 252/437; 208/138; 208/216; 208/217
[51] Int. Cl.² ........................................ B01J 27/18
[58] Field of Search .................... 252/437; 423/311

[56] References Cited
UNITED STATES PATENTS

| | | | |
|---|---|---|---|
| 2,441,297 | 5/1948 | Stirton ........................... | 252/437 X |
| 3,320,331 | 5/1967 | Gaspar et al .................... | 252/437 X |
| 3,649,523 | 3/1972 | Bertolacini et al. ............ | 252/437 X |
| 3,736,354 | 5/1973 | Yanagita et al ................. | 252/437 X |

FOREIGN PATENTS OR APPLICATIONS

| | | | |
|---|---|---|---|
| 634,837 | 3/1950 | United Kingdom ................ | 423/311 |

Primary Examiner—Patrick P. Garvin
Attorney, Agent, or Firm—Roy J. Ott

[57] ABSTRACT

A catalyst support comprised of alumina and aluminum phosphate is prepared by the hydrolysis of an aluminum alkoxide such as aluminum sec-butoxide with an aqueous solution of phosphoric acid. The alumina-aluminum phosphate prepared in accordance with the invention is a stable material which can be readily formed for use as a support for catalysts useful in a number of hydrocarbon conversion processes. For example, the alumina-aluminum phosphate support may be impregnated with various combinations of cobalt, nickel, tungsten and molybdenum for use as a catalyst for the desulfurization and denitrogenation of both light and heavy petroleum fractions. The support material may also be combined with zeolitic materials for use in hydrocracking or catalytic cracking or combined with noble metals for use in the reforming of petroleum feedstocks.

4 Claims, No Drawings

HYDROCARBON CONVERSION CATALYST COMPRISING ALUMINA AND ALUMINUM PHOSPHATE

BACKGROUND OF THE INVENTION

1. Field of the Invention

This invention relates to the preparation of catalyst supports and their use in hydrocarbon conversion processes. More particularly, this invention relates to the preparation of alumina-aluminum phosphate catalyst support materials and their use in hydrocarbon conversion processes such as catalytic cracking, hydrocracking, hydrofining and reforming.

2. Description of the Prior Art

Catalyst compositions comprising a major proportion of a support or carrier material such as alumina, silica, silica-alumina, magnesium oxide, clay, etc. and a minor proportion of one or more metal or metal oxides have been used for a variety of hydrocarbon conversion processes. These catalysts are ordinarily prepared by impregnating the support or carrier material with an aqueous solution of a soluble form of a metal catalyst component. The impregnated support material is then dried and calcined to produce a solid supported catalyst comprising a metal catalyst component.

U.S. Pat. Nos. 3,271,299 and 3,342,750 describe the preparation and use of an alumina-aluminum phosphate cogel which is prepared by reacting aluminum chloride with phosphoric acid and ethylene oxide. This prior art technique produces a granular product which is sensitive to water and difficult to form into a catalyst shape since it loses a substantial part of its surface area during the forming process, i.e., pilling, extruding, etc. In contrast, the alumina-aluminum phosphate support material prepared by the process of this invention results in a soft powdery product which is easily handled and formed by conventional techniques in the presence of water without significant degradation of its structure or properties.

SUMMARY OF THE INVENTION

In accordance with the present invention, an improved catalyst comprising alumina and aluminum phosphate is prepared by reacting an aluminum alkoxide with an aqueous solution containing phosphate ions. After recovery and calcination of the product, the resulting alumina-aluminum phosphate material may then be incorporated with various known catalyst components to produce a catalyst composition useful in a variety of hydrocarbon conversion processes, particularly with respect to the removal of sulfur and nitrogen from petroleum feeds.

The aluminum alkoxides used herein may include any alkoxide which contains from 1 to 20, preferably 2 to 4 carbon atoms in the alkoxide group and which is soluble in the liquid reaction medium. Specific examples of suitable aluminum alkoxides include, among others, aluminum sec-butoxide, aluminum ethoxide, aluminum isopropoxide, aluminum propoxide, aluminum n-butoxide and aluminum iso-butoxide. Mixed aluminum alkoxides such as those produced by oxidizing the growth product from the reaction of aluminum triethyl and ethylene are also suitable.

The phosphate ions which are reacted with the aluminum alkoxide may be derived from a phosphorus-containing acid such as the phosphoric, phosphorous and phosphonic acids. These acids may be characterized as having the formula:

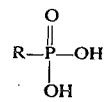

wherein R represents a hydroxyl group, hydrogen or an organic radical such as hydrocarbon radicals including alkyl, cycloalkyl, aryl, aralkyl or alkaryl and the like, containing from 1 to 12 carbon atoms. Suitable phosphorous-containing acids can include phosphoric and/or phosphorous (including hypo, meta and pyro forms thereof) acid, methylphosphonic acid, ethylphosphonic acid, hexylphosphonic acid, phenylphosphonic acid, alkylsubstituted-phenylphosphonic acid, cyclohexylphosphonic acid, alkylsubstituted-cyclohexylphosphonic acid, and the like. The halogen substituted forms of the aforementioned acids may also be used such as, for example, monofluorophosphoric acid ($H_2PO_3F$). The preferred acids are phosphoric and phosphorous acids. Soluble salts of these acids such as the ammonium, alkyl ammonium, sodium and potassium salts thereof may also be used.

The aluminum alkoxide and phosphorous-containing acid are reacted in the presence of a suitable solvent and water at a temperature ranging from ambient to the boiling point of the reaction mixture, usually in the range of 20° to 100°C., for a sufficient period of time to complete the desired reaction, usually for a period of 1 to 4 hours. The molar ratio of aluminum alkoxide to phosphate ions charged to the reaction mixture will be in the broad range of 26:1 to 1.2:1. Preferably, the relative amounts of reactants will be adjusted to give an aluminum phosphate concentration of at least 35 wt. percent so that the molar ratio of aluminum alkoxide to phosphate ions charged to the reaction mixture will preferably be in the range of 5.4:1 to 2.4:1. The amount of water utilized in the reaction is that calculated to hydrolyze the aluminum alkoxide in the reaction mixture that is not consumed by the source of phosphate ions. Usually a 10 percent molar excess of water is added to ensure complete reaction. The alumina-aluminum phosphate composition prepared in the above manner will generally contain 35 to 85 wt. percent aluminum phosphate and will preferably contain 50 to 75 wt. percent aluminum phosphate.

The reaction is preferably conducted in the presence of an organic liquid which is inert to the reactants and acts as a solvent for the system. Suitable solvents include, among others, the $C_1$–$C_4$ alcohols such as methanol, ethanol, i-propanol, n-propanol, n-butanol, iso-butanol, sec-butanol, and t-butanol. The amount of solvent used may range from 0 to 200, preferably 50 to 100 volume parts per volume part of alkoxide.

After the reaction is complete, the precipitate which has formed is filtered, dried and then combined with a minor amount of catalytic metals. Calcination of the alumina-aluminum phosphate product is conveniently effected by heating at 800° to 1,200°F. for a period of 1 to 4 hours. Addition of the metals or compounds thereof to the alumina-aluminum phosphate support or carrier material is effected by known techniques such as impregnation and vapor deposition.

The alumina-aluminum phosphate prepared in accordance with the invention has a high surface area, uniform pore distribution and is easily formed into a desired shape. Accordingly, the alumina-aluminum phosphate material may be advantageously used as a support or carrier for catalytic materials which function as hydrocarbon conversion catalysts. Thus, the invention is not based on the use of any particular hydrocarbon conversion catalyst but rather on the combination of the alumina-aluminum phosphate support described herein and one or more of the known metal or metal oxides which catalyze hydrocarbon conversion reactions. In general, these metals or compounds of such Similarly, for use in hydrogenation, dehydrogenation, aromatization and oxidation the alumina-aluminum phosphate composition of this invention may be combined with 0.0 to 50 wt. percent of any of the catalytic materials known to be useful in the aforementioned processes.

The operating conditions to be employed in the practice of the present invention are well-known and will, of course, vary with the particular conversion reaction desired. The following table summarizes typical reaction conditions effective in the present invention.

| Principal Conversion Desired | Temperature, °F. | Reaction Conditions Pressure, p.s.i.g. | Feed Rate V./V./Hr. | Hydrogen Rate s.c.f./bbl. |
|---|---|---|---|---|
| Hydrofining | 500–800 | 50–2,000 | 0.1–10.0 | 500–10,000 |
| Hydrocracking | 450–850 | 200–2,000 | 0.1–10.0 | 500–10,000 |
| Catalytic Cracking | 700–1,000 | 0–50 | 0.1–20.0 | 0 |
| Catalytic Reforming | 850–1,000 | 50–1,000 | 0.1–20.0 | 500–10,000 | metals include Groups IB, IIA, IIB, IIIB, IVA, IVB, VB, VIB, VIIB and VIII and rare earth Lanthanide Series as given in "Webster's Seventh New Collegiate Dictionary," (1963) published by G. & C. Merriam Company.

For use in desulfurization and denitrogenation of light and heavy petroleum fractions, the alumina-aluminum phosphate composition of this invention may be combined with 0 to 50, usually 20–30, wt. percent of any of the metal or metal oxides known to promote hydrofining reactions such as the Group VIB and Group VIII metals of the aforementioned Periodic Table which include among others, iron, cobalt, nickel, platinum, palladium, ruthenium, rhodium, osmium, iridium, molybdenum, tungsten and chromium.

For use in hydrocracking, the alumina-aluminum phosphate composition of this invention may be combined with 0 to 60, usually 10–25, wt. percent of any of the materials known to promote hydrocracking reactions which include, among others, nickel oxide, cobalt oxide, molybdenum oxide, tungsten oxide and zeolites (crystalline alumino silicates). The zeolites may be in the hydrogen or ammonium form or be exchanged with metal ions such as nickel, cobalt, tin, palladium, platinum and rare earths such as cerium, lanthanum, neodymium, proseodymium, etc.

For use in catalytic cracking, the alumina-aluminum phosphate composition of this invention may be used alone or combined with 0.0 to 50 wt. percent of any of the materials known to promote cracking reactions which include, among others, zinc, titanium, aluminum, zirconium, cadmium, chromium, vanadium, copper and iron; zeolites exchanged with magnesium, hydrogen, chromium, zinc, platinum, palladium, cobalt, and iron. The zeolites may be in the hydrogen or ammonium form or be exchanged with metal ions prior to combining with the alumina-aluminum phosphate composition.

For use in reforming, the alumina-aluminum phosphate composition of this invention may be combined with 0 to 20.0, usually 0.1–5, wt. percent of any of the known metals used to promote reforming catalysts which include, among others, elements from Groups VIB, VIIB, and VIII of the aforementioned Periodic Table such as tungsten, rhenium, ruthenium, iridium, palladium and platinum.

The feedstock suitable for conversion in accordance with the invention includes any of the well-known feeds conventionally employed in hydrocarbon conversion processes. Usually they will be petroleum derived, although other sources such as shale oil are not to be excluded. Typical of such feeds are included heavy and light virgin gas oils, heavy and light virgin naphthas, solvent extracted gas oils, coker gas oils, steam-cracked gas oils, middle distillates, steam-cracked naphthas, coker naphthas, catalytically-cracked naphthas, cycle oils, deasphalted residua, etc.

DESCRIPTION OF THE PREFERRED EMBODIMENTS

The following examples further illustrate the present invention. Unless otherwise specified, all percentages and parts are by weight.

EXAMPLE 1

This example demonstrates the preparation of an alumina-aluminum phosphate composition in accordance with the invention. 695 grams of aluminum sec-butoxide were placed in a 3 liter glass flask fitted with a reflux condenser and heated with stirring to 180°F. A mixture of 1,000 milliliters of isopropyl alcohol, 134 grams of water, and 56 grams of 85% phosphoric acid was then added to the flask over a 3 hour period while maintaining the temperature at 180°F. Thereafter, the reactor contents were cooled and the solid alumina-aluminum phosphate precipitate which had formed was recovered by filtration. The recovered alumina-aluminum phosphate mixture was then calcined by heating for 2 hours at 1,000°F. to produce a product having a phosphorus content of 8.0 wt. % and a surface area of 408 $M^2/g$ (square meters per gram).

EXAMPLE 2

This example demonstrates the effect that variations in the ratio of aluminum alkoxide and phosphoric acid have on the product's aluminum phosphate concentration, surface area and pore volume.

Using the procedure and conditions described in Example 1, various ratios of aluminum alkoxide and phosphoric acid were reacted to produce the products shown in Table I.

TABLE I

| $Al_2O_3$—$AlPO_4$ Preparation | Reagents Used[1] $H_2O$ | 85% $H_3PO_4$ | $AlPO_4$ Conc. Wt. % | Product Formed[2] Surface Area $M^2/g$ | Pore Volume cc/g |
|---|---|---|---|---|---|
| A | 167.5 | 0 | 0 | 331 | 1.84 |
| B | 150 | 28 | 18.1 | 404 | 1.93 |
| C[3] | 134 | 56 | 31.5 | 408 | 1.79 |
| D | 104.4 | 96 | 48.1 | 353 | 1.36 |
| E | 3.4 | 265 | 74.0 | 217 | 1.34 |

[1] All experiments used 695 grams of aluminum sec-butoxide and 1000 ml. of isopropyl alcohol.
[2] After calcination at 1000°F. for 2 hours.
[3] Preparation of Example 1.

EXAMPLE 3

The preparation of Example 1 was repeated with the exception that the reaction time was shortened from 3 hours to 1 hour. The product produced therefrom was divided into two portions. One portion was calcined for 2 hours at 1,000°F. to produce a product which was found to have a surface area of 375 $M^2/g$. The other portion of the product, without calcining, was mulled with water to make a mix containing 40 wt. percent solids. The mix was extruded to 1/16 in. diameter in a piston extruder. After drying and calcining for 2 hours at 1,000°F., the extrudate had a surface area of 316 $M^2/g$ and a crush strength of 10 psig. In contrast, when an alumina-aluminum phosphate composition is prepared as taught in the prior art, e.g., U.S. Pat. Nos. 3,342,750 and 3,271,299, the resultant product is found to deteriorate when the product is formed in a similar manner.

EXAMPLE 4

This example demonstrates that the alumina-aluminum phosphate composition prepared in accordance with this invention can advantageously be used for the preparation of hydrocarbon conversion catalysts.

The alumina-aluminum phosphate products identified as B, C and E in Table I of Example 2 were mixed with a nickel zeolite (a crystalline aluminosilicate wherein 84 percent of the sodium ions were exchanged with nickel cations) and then extruded to form an extrudate containing 80 wt. percent of alumina-aluminum phosphate and 20 wt. percent nickel zeolite. The extrudates were then impregnated with aqueous solutions of ammonium molybdate and nickel nitrate and thereafter calcined at 1,000°F. for 3 hours to produce an extrudate having a composition of 3.0 wt. percent nickel oxide (NiO) and 15.0 wt. percent molybdenum oxide ($MoO_3$). These catalysts were then employed in the hydrocracking of a raw Kuwait Vacuum Gas Oil. The properties of this feed are given in Table II.

TABLE II

PROPERTIES OF KUWAIT VACUUM GAS OIL

| | |
|---|---|
| Sulfur, Wt. % | 3.03 |
| Gravity, °API | 20.2 |
| Aniline Point, °F. | 173 |
| Pour Point, °F. | 105 |
| Nitrogen, ppm | 880 |
| Distillation | |
| Initial B.P., °F. | 798 |
| 5% | 825 |
| 10% | 837 |
| 20% | 850 |
| 30% | 862 |
| 40% | 874 |
| 50% | 886 |
| 60% | 898 |
| 70% | 913 |
| 80% | 937 |
| 90% | 963 |
| 95% | 986 |
| Final B.P., °F. | 1028 |
| Rec., % | 99.0 |
| Res., % | 1.0 |

The reaction conditions were a pressure of 2,000 psig., a liquid hourly space velocity of 1.0 and a hydrogen to feed ratio of 10,000 SCF/B. The temperature was adjusted to give 50 percent conversion to product boiling below 570°F. The results given below in Table III show that the selectivity to the desired 300°–570°F. product increases as the amount of aluminum phosphate in the catalyst base increases.

TABLE III

HYDROCRACKING WITH CATALYSTS SUPPORTED ON $Al_2O_3$—$AlPO_4$

| Catalyst Base | Wt. % $AlPO_4$ in Amorphous Part of Cat. Base | °F. Required for 50% Conversion | Selectivity to 300–570°F. Product at 50% Conversion |
|---|---|---|---|
| Composition B of Example 2 | 18 | 740 | 50 |
| Composition C of Example 2 | 32 | 737 | 50 |
| Composition E of Example 2 | 74 | 750 | 76 |

EXAMPLE 5

This example demonstrates that the alumina-aluminum phosphate composition prepared in accordance with this invention can advantageously be used for the preparation of hydrodesulfurization and hydrodenitrogenation catalysts. Several of the total liquid products obtained during the experiment described in Example 4 were analyzed for sulfur and nitrogen. The results given in Table IV show the effectiveness of the catalysts of this invention for reducing the sulfur and nitrogen levels of the feed. Catalysts containing a high level of $AlPO_4$ in the amorphous portion of the base (e.g., catalyst E containing 74 wt. percent of $AlPO_4$ in the amorphous base) are particularly efficient for the removal of nitrogen from petroleum feeds.

TABLE IV

| Catalyst Base | Conversion to 570°F. Minus | Liquid Product Inspections Sulfur, Wt. % | Nitrogen, ppm |
|---|---|---|---|
| Composition B of Example 2 | 32.5 | — | 398 |
| | 48.7 | 0.22 | 290 |
| Composition C | 51.4 | 0.21 | 117 |
| | 28.5 | 0.36 | 390 |

TABLE IV-Continued

| Catalyst Base | Conversion to 570°F. Minus | Liquid Product Inspections Sulfur, Wt. % | Nitrogen, ppm |
|---|---|---|---|
| of Example 2 | 45.4 | — | 265 |
|  | 49.0 | 0.17 | 190 |
| Composition E | 13.5 | 0.08 | 35 |
| of Example 2 | 23.0 | 0.02 | 1 |
|  | 38.8 | 0.04 | <1 |
|  | 47.4 | 0.03 | <1 |

EXAMPLE 6

This example demonstrates that the alumina-aluminum phosphate composition prepared in accordance with this invention can advantageously be used for the preparation of reforming catalysts. The calcined extrudates from Example 3 were impregnated with chloroplatinic acid and recalcined. The finished catalyst, containing 0.3 wt. percent platinum on 0.7 wt. percent chlorine was used to reform an Aramco naphtha at 930°F., 200 psig. total pressure, 4,600 SCF/B hydrogen, and 1.13 weights of feed per hour per weight of catalyst. Analysis of the C₅+ fractions of the feed and products are shown in Table V. It is seen that the aromatic content of the product and hence its octane, is considerably higher than that of the feed.

TABLE V

| Component | Analysis of $C_5+$ Fraction, Volume Percent Feed | Product |
|---|---|---|
| $C_5$ | 0.05 | 7.83 |
| $C_6$ | 6.50 | 9.00 |
| $C_7$ | 22.36 | 15.47 |
| $C_8$ | 23.91 | 7.46 |

TABLE V -Continued

| Component | Analysis of $C_5+$ Fraction, Volume Percent Feed | Product |
|---|---|---|
| $C_9-C_{10}$ | 34.41 | 1.95 |
| Benzene | 0.20 | 2.84 |
| Toluene | 2.29 | 10.28 |
| Heavy Aromatics | 10.28 | 45.17 |

What is claimed is:

1. An alumina-aluminum phosphate catalyst support containing 35 to 85 wt. percent aluminum phosphate and prepared by the reaction in aqueous medium of aluminum alkoxide with a phosphorus-containing acid or soluble salt thereof at an aluminum alkoxide/phosphate ion molar ratio in the range of 26:1 to 1.2:1, said phosphorus-containing acid having the formula:

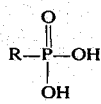

wherein R represents a hydroxyl group, hydrogen or a hydrocarbon radical containing from 1 to 12 carbon atoms.

2. The alumina-aluminum phosphate of claim 1 wherein said phosphorus-containing acid is selected from the group consisting of phosphoric acid, phosphorous acid and mixtures thereof.

3. The alumina-aluminum phosphate of claim 2 wherein said aluminum alkoxide/phosphate ion molar ratio is in the range of 5.4:1 to 2.4:1.

4. The alumina-aluminum phosphate of claim 3 wherein said alumina-aluminum phosphate contains 50 to 75 wt. percent aluminum phosphate.

* * * * *